United States Patent [19]

Kawanishi et al.

[11] Patent Number: 4,853,707

[45] Date of Patent: Aug. 1, 1989

[54] NON-IMPACT ELECTROTHERMIC RECORDING METHOD

[75] Inventors: Toshiyuki Kawanishi, Numazu; Yukio Tabata, Shizuoka, both of Japan

[73] Assignee: Ricoh Company, Ltd., Tokyo, Japan

[21] Appl. No.: 231,205

[22] Filed: Aug. 11, 1988

Related U.S. Application Data

[63] Continuation of Ser. No. 894,376, Aug. 6, 1986, abandoned, which is a continuation of Ser. No. 748,123, Jun. 21, 1985, abandoned, which is a continuation-in-part of Ser. No. 398,788, Jul. 16, 1982, abandoned.

[30] Foreign Application Priority Data

Jul. 17, 1981 [JP] Japan ............................... 56-112757

[51] Int. Cl.[4] ............................................ G01D 15/10

[52] U.S. Cl. ................................ 346/1.1; 346/76 PH

[58] Field of Search ................. 346/76 R, 76 PH, 1.1, 346/135.1; 400/120; 219/216

[56] References Cited

U.S. PATENT DOCUMENTS

| | | | |
|---|---|---|---|
| 4,071,849 | 1/1979 | Koyano et al. | 346/1 |
| 4,268,838 | 5/1981 | Nakano et al. | 219/216 PH X |
| 4,284,876 | 8/1981 | Ishibashi et al. | 219/216 PH |
| 4,309,117 | 1/1982 | Chang et al. | 346/76 PH X |
| 4,335,968 | 6/1982 | Regnault | 400/120 |
| 4,400,100 | 8/1983 | Auiram et al. | 400/120 |
| 4,415,903 | 11/1983 | Kawanishi et al. | 346/76 PH X |
| 4,461,586 | 7/1984 | Kawanishi et al. | 400/120 |

FOREIGN PATENT DOCUMENTS 2137936 10/1984 United Kingdom .

OTHER PUBLICATIONS

IBM Technical Disclosure Bulletin, vol. 18, No. 8 (Jan. 1976), "Thermal Transfer Printer Employing Special Ribbons Heated With A Current Pulse".

*Primary Examiner*—Todd E. Deboer
*Attorney, Agent, or Firm*—Cooper & Dunham

[57] ABSTRACT

A non-impact electrothermic recording method using an ink sheet comprising at least an electroconductive base layer, an electroconductive thin layer and an electroconductive image transfer ink layer, with the effective resistance of the ink sheet being in the range of from 50Ω to 20 KΩ, is disclosed which is carried out by superimposing the ink sheet on a recording medium and applying between an recording electrode and a return electrode situated in contact with the ink sheet (i) image-delineating voltage signals with a fixed application time, with the voltage of the image-delineating signals changed in accordance with the image density of images to be reproduced on the recording medium, or (ii) image-delineating voltage signals with a fixed voltage, with the application time changed in accordance with the image density of images to be reproduced on the recording medium, so as to generate Joule's heat in the portions in the ink sheet immediately below the recording electrode; and transferring the electroconductive thermal-transferable ink material from the ink sheet to the recording medium.

10 Claims, 6 Drawing Sheets

NON-IMPACT ELECTROTHERMIC RECORDING METHOD

This application is a continuation of application Ser. No. 894,376, filed 8/6/86, now abandoned, which is a continuation of Ser. No. 758,123, filed 6/21/85, now abandoned, which is a continuation-in-part of Ser. No. 398,788, filed 7/16/82, now abandoned.

FIELD OF THE INVENTION

The present invention relates to an electrothermic recording method using an ink sheet comprising an electroconductive base layer and an electroconductive image transfer ink layer.

More particularly the present invention discloses an electrothermic recording method comprising the steps of: closely superimposing on a recording medium, such as a paper sheet, the electroconductive image transfer ink layer of an ink sheet; placing a recording electrode and a return electrode with a predetermined distance therebetween in close contact with the electroconductive base layer; and either (a) applying between the recording electrode and the return electrode image-delineating signals for a fixed period of time, with the voltage of the image-delineating signals being regulated in accordance with the image density of images to be reproduced on the recording sheet, or (b) applying between the two electrodes image-delinearing signals a fixed voltage, with the duration of application of the image-delineating signals being regulated in accordance with the image density of images to be recorded on the recording sheet, so as to generate Joule's heat in the portion of the electroconductive image transfer ink layer immediately below the recording electrode; and transferring the ink layer or a thermal-transferable ink material contained in the ink layer to the receiving surface of the recording medium, with dot densities corresponding to the densities of the original images being reproduced.

In the conventional thermosensitive image transfer method, a thermosensitive recording sheet consists of a base film and a thermosensitive ink layer formed thereon where the latter is softened or melted upon application of heat thereto. In this conventional thermosensitive image transfer method, the thermosensitive ink layer is brought into close contact with a recording medium such as a sheet of plain paper. A thermal head is then brought into contact with the base film and transmits thermal energy to the thermosensitive ink layer through the base film, whereby a thermally-transferable ink material contained in the ink layer is imagewise transferred to the recording medium.

The image transfer process of this conventional thermosensitive image transfer process will now be explained by referring to FIG. 1*a*.

Reference numeral 1 represents a thermal head; reference numeral 2, a thermosensitive ink sheet; reference numeral 2*a*, a thermosensitive ink layer; reference numeral 2*b*, a base film; reference numeral 3, a recording medium; and reference 2*c*, a portion of the ink layer which has been transferred to the recording medium 3.

In this image transfer process, thermal energy is indirectly applied to the thermosensitive ink layer 2*a* through the base film 2*b*. Referring now to FIG. 1*b* the amount of applied thermal energy is, for instance, $E_1$, which is an energy level below a threshold value, $L_1$ for ink transfer, scarcely any ink is transferred to the recording medium 3. However, when the amount of the applied energy is, for instance, $E_2$, which exceeds the threshold value, a substantially amount of ink, $D_2$is transferred to the recording medium 3, as schematically illustrated in FIG. 1*b*.

In FIG. 1*b*, reference symbol Wh represents the width of a thermal head, the broken line L represents a critical temperature level for the transfer of ink from the ink layer, $D_1$ and $D_2$ respectively indicate the relative plan views of the transferred ink dots, while $D_{1S}$ and $D_{2S}$ respectively indicate the relative sectional views of the transferred ink dots.

Therefore, in the conventional thermosensitive image transfer process, the ink is transferred in a digital all-or-none manner, so that it is difficult to obtain images with distinguishable density gradiations in between the all-or-none levels. Furthermore, in this conventional process, since the recording energy applied by the thermal head is indirectly transferred to the thermo-sensitive ink layer 2*a* through the base film 2*b*, the applied energy diffuses within the base film 2*b* before it arrives at the ink layer 2*a* as shown in FIG. 1*a*, and it is extremely difficult to obtain sharp ink images on the recording medium 3.

If conventional thermosensitive coloring sheet containing a thermosensitive coloring layer is used for forming images thereon by direct contact of a thermal head with the thermosensitive coloring layer, the coloring reaction occurs at the surface of the thermosensitive coloring layer, and the amount of applied energy can be made substantially proportional to the desired image density within a predetermined limited range. However, in the conventional thermosensitive image transfer process, the above described shortcomings in obtaining good density gradation are unavoidable.

In order to improve the density gradation of the recorded images by the conventional thermosensitive image transfer process, the following method has been proposed:

In this method, a certain grey scale is set up, in which image densities are divided up into a certain number of gradations each of which corresponds to a certain number of dots to be reproduced on the recording medium in accordance with the average image density of the original images in a unit area thereof. This method is capable of reproducing relatively good images corresponding to original images as a whole in terms of image density, since the average image density in a unit area of the original image is caused to correspond to the copied image density in the same unit area on the recording medium. However, in areas smaller than the unit area, such as where the original contains a sharp edge, the reproduced images are not always faithful to the original images, since the reproduced images depend upon the arrangement of the recording styli such as where the original contains a sharp edge,.

SUMMARY OF THE INVENTION

It is therefore an object of the present invention to provide a non-impact electrothermic recording method capable of reproducing images with high resolution and excellent image gradation faithful to the original images, even with respect to small areas of the original images.

The object of the present invention is achieved by the non-impact electrothermic recording method which comprises the steps of closely superimposing on a recording medium such as a paper sheet, the electroconductive image transfer ink layer of an ink sheet; placing a recording electrode and a return electrode with a predetermined distance therebetween in close contact with the electro-conductive base layer; and either (a) applying between the recording electrode and the return electrode image-delineating signals for a fixed period of time, with the voltage of the image-delineating signals being regulated in accordance with the image density of images to be reproduced on the recording sheet, or (b) applying between the recording electrode and the return electrode image-delinearing signals of a fixed voltage, with the period of application of the image-delineating signals being regulated in accordance with the image density of images to be recorded on the recording sheet, so as to generate Joule's heat in the portions in the electro-conductive image transfer ink layer immediately below the recording electrode; and transferring the ink layer or a thermal-transferable ink material contained in the ink layer (hereinafter collectively referred to as the ink layer) to the receiving surface of the recording medium, with dot densities corresponding to the densities of the original images.

According to the present invention, electric current flows through the electroconductive image transfer ink layer and Joule's heat is generated within the ink layer itself, so that the ink layer is transferred to the recording medium in an amount proportional to the amount of Joule's heat generated therein, and excellent image gradation can be obtained.

DETAILED DESCRIPTION OF THE PREFERRED EMBODIMENT

Figure 1A:
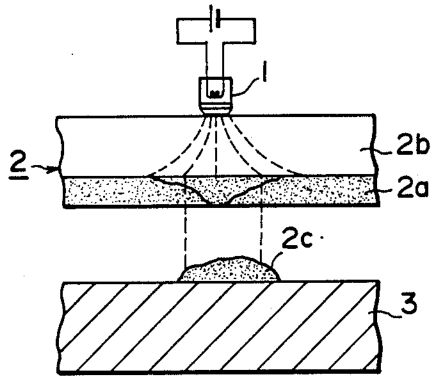
PRIOR ART FIG. 1a
FIG. 1*a* is a schematic diagram of a thermosensitive image transfer process using a conventional thermosensitive ink sheet including a thermosensitive ink layer.
Figure 1B:
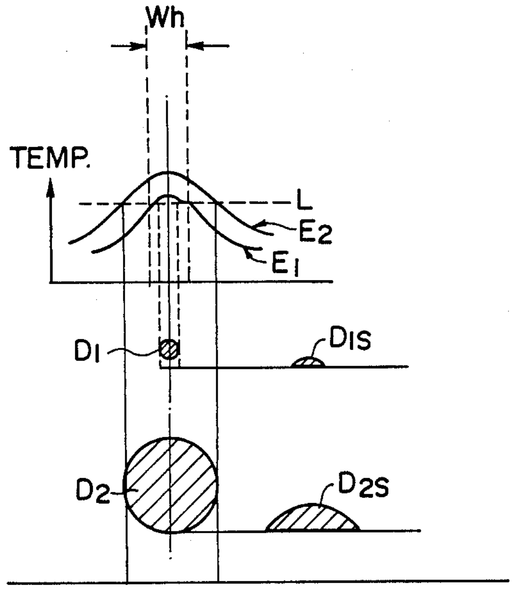
PRIOR ART FIG. 1b
FIG. 1*b* is a schematic diagram of the ink layer transfer step in the conventional thermosensitive image transfer process shown in FIG. 1*a*.

By referring to FIG. 2, a non-impact electrothermic recording apparatus by which the non-impact electrothermic recording method according to the present invention can be carried out will now be explained.

In the figure, reference numeral 4 indicates an ink sheet; reference numeral 4*a*, an electroconductive ink layer; and reference numeral 4*b*, an electroconductive base layer. A recording medium 3 is disposed in contact with the electroconductive ink layer 4*a*.

On the electroconductive base layer 4*b* of the ink sheet 4, a recording electrode 5 comprising a plurality of recording styli is situated. The recording electrode 5 is supported by an electrically insulating support member 6. The lower portion of each recording stylus is in contact with the surface of the ink sheet 4. Further, there is disposed a return electrode 7 with a predetermined distance from the recording electrode 5. The return electrode 7 is also in contact with the surface of the ink sheet 4 but its contact area with the ink sheet 4 is greater than the total contact areas with the ink sheet 4 of the recording electrode 5.

An image-delineating signal application apparatus 8 is connected to the recording electrode 5 and the return electrode 7. The image-delineating signal application apparatus 8 outputs pulse-like image-delineating signals, corresponding to original images to be reproduced, through using for example light receiving elements (not shown) for converting optical original images to electric signals, and an amplifier (not shown) for amplifying the electric signals. The image-delineating signals are applied between the recording electrode 6 and the return electrode for a period of time corresponding to the density of each image element of the original image.

When image-delineating signals are applied between one or more selected recording styli of the recording electrode 5 and the return electrode 7, the corresponding image-delineating current flows through the ink sheet 4. Since the contact area with the ink sheet 4 of the return electrode 7 is significantly greater than the total contact area with the ink sheet 4 of the recording styli, and, of course, greater than the contact area with the ink sheet 4 of each recording stylus, and since the same amount of electric current flows through the recording styli as through the return electrode 7, the current density in the portion of the ink sheet 4 immediately below each recording stylus is much greater than the current density in the portion of the ink sheet 4 below the return electrode 7. Therefore, a much greater amount of Joule's heat is generated below the recording styli as compared to the insignificant Joule's heat generated below the return electrode 7. As a result, by selecting an electroconductive thermal-transferable ink with an appropriate melting point, and by supplying an appropriate amount of electric current, only the portion of the ink layer 4*a*, or an electro-conductive thermal-transferable ink material contained in the ink layer 4*a*, immediately below the recording stylus is melted by the Joule's heat and is then transferred in the form of a dot to the recording medium 4.

Figure 3A:
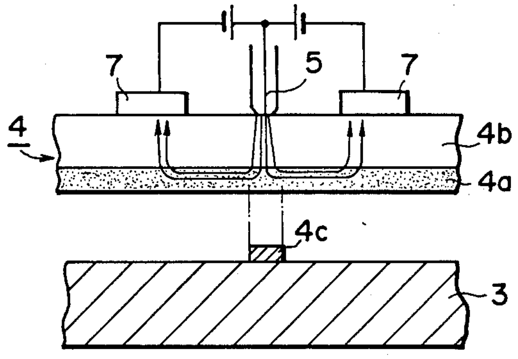
FIG. 3*a* is a schematic diagram of the recording process in the non-impact electrothermic recording method according to the present invention.

FIG. 3*a* schematically shows the recording process of a non-impact electrothermic recording method according to the present invention.

Figure 3B:
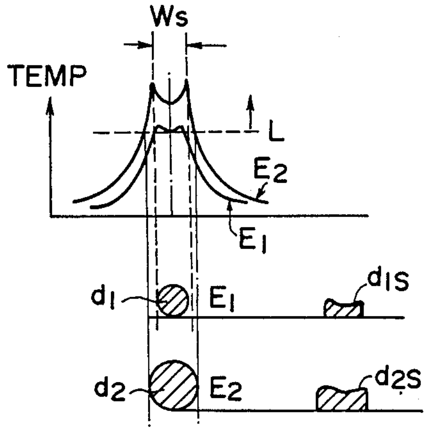
FIG. 3*b* is a schematic diagram of the image transfer in the non-impact electrothermic recording method shown in FIG. 3*a* according to the present invention.

FIG. 3*b* schematically shows the ink transfer in the non-impact electrothermic recording method according to the present invention. In FIG. 3*b*, reference symbol Ws indicates the width of a recording stylus, and a broken line L represents a critical temperature level for the transfer of the ink layer. Reference symbols $d_1$ and $d_2$ respectively indicate the relative plan views of the transferred ink dots when the amounts of the applied energy are $E_1$ and $E_2$. Reference symbols $d_{1s}$ and $d_{2s}$ indicate the relative sectional views of the transferred ink dots $d_1$ and $d_2$.

In the non-impact electrothermic recording method according to the present invention, electric current directly flows through the ink sheet 4 and the ink material is softened and melted by the Joule's heat generated within the electroconductive image transfer ink layer. Therefore, the ink material is transferred to the recording medium 3 in an amount proportional to the applied energy. Furthermore, since the density of recorded dots is proportional to the amount of the transferred ink material, the density of the recorded dots is substantially proportional to the quantity of Joule's heat generated.

In general, the quantity of Joule's heat generated in a material is proportional to the product of (i) the voltage applied to the material, (ii) the quantity of the electric current which flows through the material and (iii) the application time. If a constant electric current is used, the amount of Joule's heat generated in the ink sheet will be proportional to the applied voltage when the current application time is kept constant, or in the alternative, it is proportional to the current application time when the applied voltage is keep constant. Consequently, the density of each dot recorded on the recording medium 3 is also substantially proportional to the voltage of the image-delineating signal when the application time of the image-delineating voltage is constant and, the density of each dot is also substantially proportional to the application time of the image-delineating voltage when the voltage of the image-delineating signal is constant.

In the non-impact electrothermic recording method according to the present invention, since the energy loss is small in the course of the transfer of electric energy, the transfer of the ink material is started upon application of a small amount of energy and the amount of the transferred ink material continuously increases substantially in proportion to the amount of applied energy.

The ink sheet for use in the present invention comprises at least an electroconductive ink layer and an electroconductive base layer for supporting the ink layer thereon. It is preferable that the effective resistance of the ink sheet between electrodes be in the range of 50Ω to 20KΩ.

When the ink sheet is of a two-layer type, consisting of an electroconductive ink layer and an electroconductive base layer, it is preferable that the thickness of the ink layer be in the range of 1 μm 10 μm, more preferably in the range of 3 μm to 6 μm, and the thickness of the base layer be in the range of 5 μm to 30 μm, more preferably in the range of 10 μm to 20 μm, and the effective resistance of the ink sheet be in the range of 1KΩ to 20KΩ.

In the present invention, it is preferable that the voltage of the applied image-delineating signal be in the range of 3 V to 400 V, more preferably in the range of 5 V to 300 V.

When the ink sheet is of a three-layer type, consisting of an electroconductive base layer, an electroconductive thin layer deposited on the base layer, and an electro-conductive ink layer formed on the electroconductive thin layer, it is also preferable that the thickness of the ink layer be in the range of 1 μm to 10 μm, more preferably in the range of 3 μm to 6 μm, the thickness of the electro-conductive layer be in the range of 0.01 μm to 5 μm, more preferably in the range of 0.05 μm to 2 μm, and the thickness of the base layer be in the range of 5 μm to 30 μm, more preferably in the range of 10 μm to 20 μm, and the effective resistance of the ink sheet be in the range of 50Ω to 1KΩ. In the three-layer type ink sheet, the electroconductive layer can be formed by depositing, for instance, aluminum, on the electroconductive base layer in a vacuum.

Figure 2:
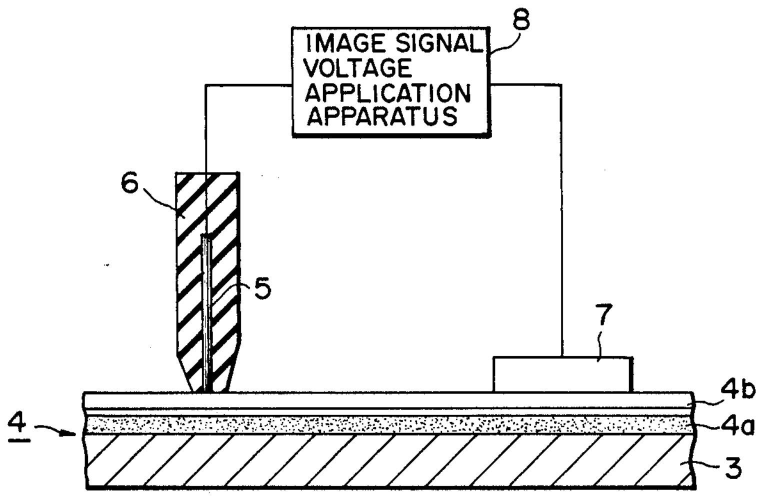
FIG. 2 is a schematic diagram of a non-impact electro-thermic recording apparatus by which the present invention can be carried out.

The effective resistance of the ink sheet for use in the present invention can be measured by the recording apparatus as shown in FIG. 2, in which the recording electrode 5, has a recording stylus with a diameter of 100 μm incorporated therein and the return electrode 7 is located a distance of 500 μm from the recording stylus, in accordance with the formula, $R_{ef}=V_A/I$, where $V_A$ is the applied voltage and I is the electric current which flows from the recording stylus to the return electrode.

In the present invention, when the effective resistance of the ink sheet is less than 50Ω, that is, $R_{ef}<50\Omega$, the recording electric current I becomes too large, so that recording with a multi-stylus electrode becomes difficult. For instance, when $V_A=100$ V and I is more than 2 A per pin, that is, I>2A/pin, the number of pins by which recording can be done is about 10 at best. On the other hand, when the effective resistance of the ink sheet is more than 20KΩ, it is necessary to increase $V_A$ in order to obtain the necessary power $W(=V_A^2/R_{ef})$ for recording. For instance, a power of about 2 W is necessary per dot when recording with an application time of 0.2 ms.

The present invention will now be explained more specifically by referring to the following Examples:

EXAMPLE 1-1

An electroconductive thin layer of Al was formed with a thickness of 0.1 μm by vacuum deposition on an electro-conductive base layer having a thickness of 12 μm consisting of 80 wt. % of 6-nylon and 20 wt. % of carbon black which was prepared by the extrusion method.

To a mixed solvent consisting of methyl ethyl ketone and toluene with a mixing ratio of 1:1 by weight, a mixture of 85 parts by weight of ethylene - vinyl acetate copolymer and 15 parts by weight of carbon black was added.

This mixture was dispersed in a ball mill for 8 hours, so that an electroconductive image transfer ink layer formation liquid was prepared.

The thus prepared ink layer formation liquid was coated on the above electroconductive thin layer by a doctor blade and was then dried, whereby an electroconductive image transfer ink layer with a thickness of 4 μm was formed, whereby an ink sheet No. 1 for use in the present invention was prepared. The effective resistance of the ink sheet No. 1 was 200Ω.

The ink sheet No. 1 was placed on a sheet of plain paper in such a manner that the ink layer was in close contact with the plain paper.

Recording styli with a diameter of 130 μm, were arranged with a density of 8 styli per mm, and were placed on the electroconductive base layer with a distance of 1 mm between the recording styli and the return electrode.

The contact area of the return electrode with the electroconductive base layer was 10 mm$^2$. Under this condition, image-delineating signals with a pulse width of 0.5 msec were applied between the multi-stylus recording electrode and the return electrode, with the voltage of the image-delineating signals changed from 5 V to 25 V.

Figure 4A:
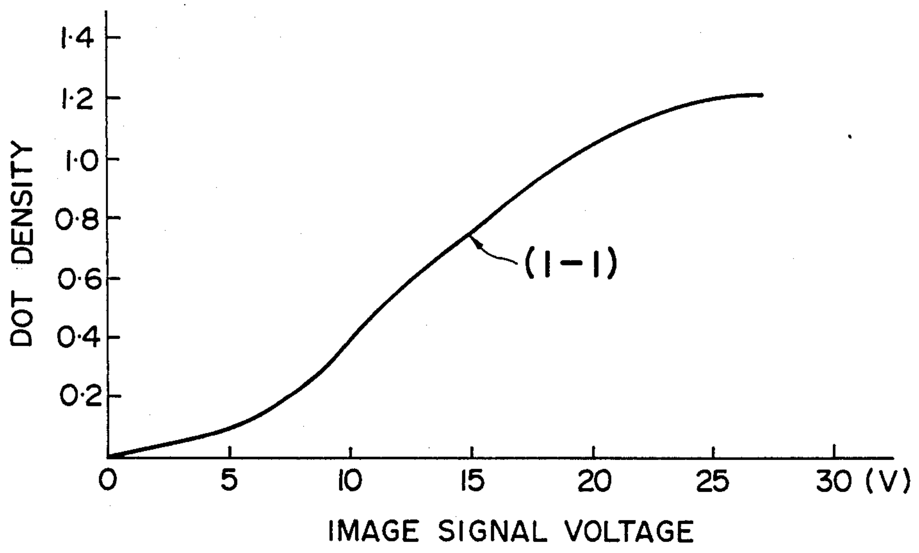
FIG. 4*a* is a graph in explanation of the relationship between the recorded dot density and the voltage of the image-delineating signals when the voltage was changed with the pulse width (application time) of the applied image-delineating signals kept constant in Example 1-1.

The relationship between the recorded dot density and the voltage of the image-delineating signals was as shown by the curve (1-1) in FIG. 4*a*. The number of image gradation levels that can be used in practice for reproduction was 11.

EXAMPLE 1-2

Example 1-1 was repeated except that the voltage of the image-delineating signals was fixed at 20 V, and the application time (pulse width) of the image-delineating current was changed from 0.1 msec to 1.0 msec, so that non-impact electrothermic dot recording was performed on a sheet of plain paper by use of the ink sheet No. 1 prepared in Example 1-1.

Figure 4B:
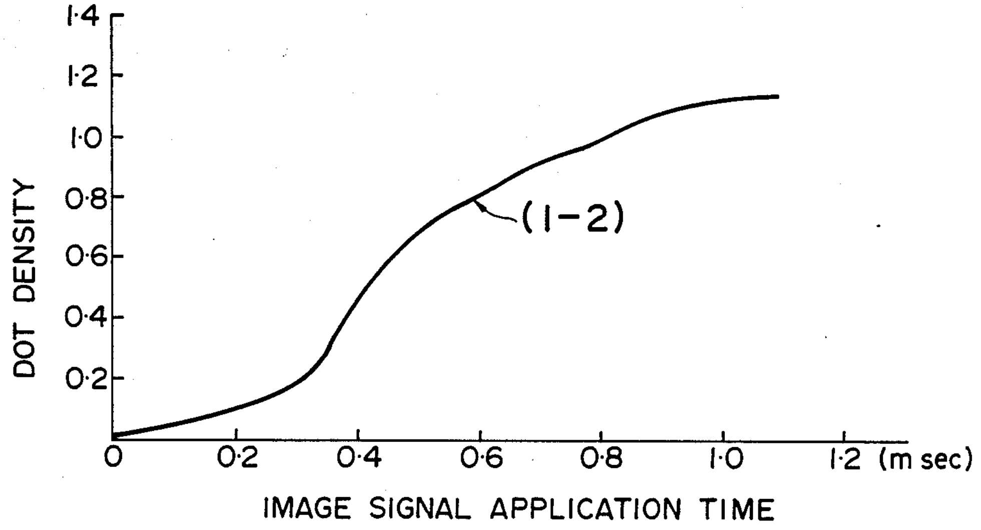
FIG. 4*b* is a graph in explanation of the relationship between the recorded dot density and the application time of the image-delineating signals when the pulse width (application time) of the applied image-delineating signals was changed with the voltage of the applied image-delineating signals kept constant in Example 1-2.

The relationship between the recorded dot density and the application time of the image-delineating signals was as shown by the curve (1-2) in FIG. 4*b*. The number of image gradation levels in production that can be used in practice was 9.

EXAMPLE 2-1

An electroconductive thin layer of Al was formed with a thickness of 0.1 μm by vacuum deposition on an electro-conductive base layer having a thickness of 12 μm consisting of 75 wt. % of 6-nylon and 25 wt. % of carbon black which was prepared by the extrusion method.

A mixture of the following components was added to a mixed solvent consisting of methyl ethyl ketone and toluene with a mixing ratio of 1:1 by weight and was dispersed in a ball mill for 8 hours, so that an electroconductive image transfer ink layer formation liquid was prepared:

| | Parts by Weight |
|---|---|
| Ethylene - vinylacetate copolymer | 20 |
| Microwax | 65 |
| Phthalocyanine | 15 |

The thus prepared ink layer formation liquid was coated on the above electroconductive thin layer by a doctor blade and was then dried, so that an electroconductive image transfer ink layer with a thickness of 5 μm was formed, whereby an ink sheet No. 2 for use in the present invention was prepared. The effective resistance of the ink sheet No. 2 was 200Ω.

The ink sheet No. 2 was placed on a sheet of plain paper in such a manner that its ink layer was in close contact with the plain paper.

By use of the same non-impact electrothermic recording apparatus as that employed in Example 1-1, non-impact electrothermic recording was performed under the conditions that image-delineating signals with a pulse width of 0.5 msec were applied between the multi-stylus recording electrode and the return electrode, with the voltage of the image-delineating signals being changed from 5 V to 25 V.

Figure 5A:
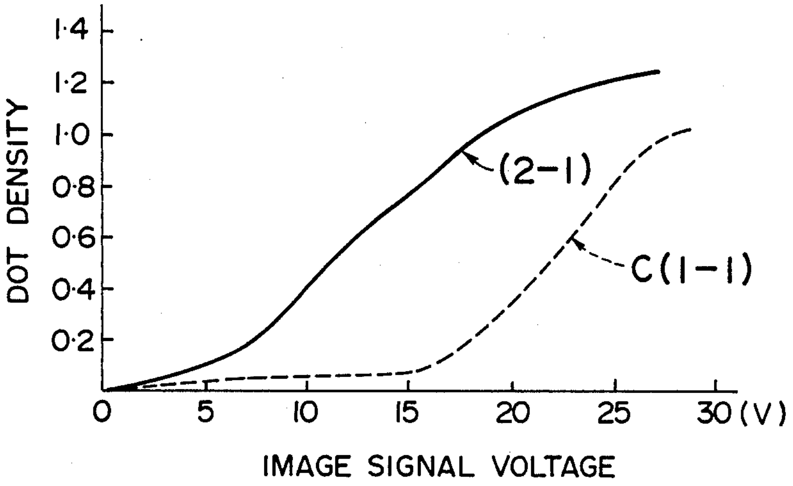
FIG. 5*a* is a graph in explanation of the relationship between the recorded dot density and the voltage of the image-delineating signals when the voltage was changed with the pulse width (application time) of the applied image-delineating signals kept constant in Example 2-1 and Comparative Example 1-1.

The relationship between the recorded dot density and the voltage of the image-delineating signals was as shown by the curve (2-1) in FIG. 5*a*. The number of image gradation levels in production that can be used in practice was found to be 10 to 12.

EXAMPLE 2-2

Example 2-1 was repeated except that the voltage of the image-delineating signals was fixed at 20 V, and the application time (pulse width) of the image-delineating current was changed from 0.1 msec to 0.5 msec, so that non-impact electrothermic dot recording was performed on a sheet of plain paper by use of the ink sheet No. 2 prepared in Example 2-1.

Figure 5B:
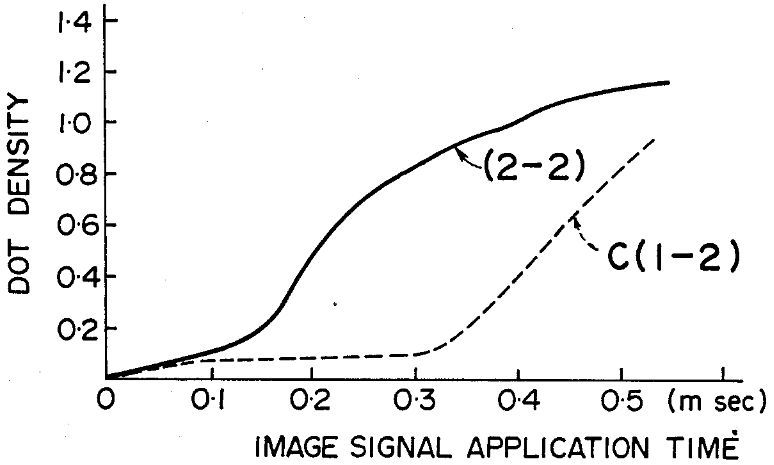
FIG. 5*b* is a graph in explanation of the relationships between the recorded dot density and the application time of the image-delineating signals when the pulse width (application time) of the applied image-delineating signals was changed with the voltage of the applied image-delineating signals kept constant in Example 2-2 and Comparative Example 1-2.

The relationship between the recorded dot density and the application duration of the image-delineating signals was as shown by the curve (2-2) in FIG. 5*b*. The number of image gradation levels that can be used in practice for reproduction was found to be 8 to 10.

COMPARATIVE EXAMPLE 1-1

Example 2-1 was repeated except that the electroconductive base layer was made with a thickness of 35 μm and the electroconductive image transfer ink layer was made with a thickness of 12 μm, whereby a comparative ink sheet No. 1 was prepared. The effective resistance of the comparative ink sheet No. 1 was 100Ω.

By use of the comparative ink sheet No. 1, ink dots were formed on a sheet of plain paper in the same manner as in Example 2-1.

The relationship between the recorded dot density and the voltage of the image-delineating signals was as shown by the curve C(1-1) in FIG. 5*a*. The number of image gradation levels that can be used in practice was 3 to 4.

COMPARATIVE EXAMPLE 1-2

By use of the comparative ink sheet No. 1 prepared in Comparative Example 1-1, ink dots were formed on a sheet of plain paper in the same manner as in Example 2-2.

The relationship between the recorded dot density and the application time of the image-delineating signals was as shown by the curve C(1-2) in FIG. 5*b*. The number of image gradation levels that can be used in practice for reproduction was 3 to 4.

EXAMPLE 3-1

An electroconductive thin layer of Al with a thickness of 0.1 μm was formed by vacuum deposition on an electro-conductive base layer with a thickness of 10 μm consisting of 85 wt. % of 12-nylon and 15 wt. % of carbon black which was prepared by the extrusion method.

A mixture of the following components was added to a mixed solvent consisting of methyl ethyl ketone and toluene with a mixing ratio of 1:1 by weight and was dispersed in a ball mill for 8 hours, so that an electroconductive image transfer ink layer formation liquid was prepared:

| | Parts by Weight |
|---|---|
| Polyethylene wax | 90 |
| Oil pink | 10 |

The thus prepared ink layer formation liquid was coated on the above electroconductive thin layer by a doctor blade and was then dried, so that an electroconductive image transfer ink layer with a thickness of 2 μm was formed, whereby an ink sheet No. 3 for use in the present invention was prepared. The effective resistance of the ink sheet No. 3 was 1.2KΩ.

The ink sheet No. 3 was placed on a sheet of plain paper in such a manner that the ink layer was in close contact with the plain paper. By use of the same non-impact electrothermic recording apparatus as that employed in Example 1-1, non-impact electrothermic recording was then performed under the conditions that image-delineating signals with a pulse width of 0.5 msec were applied between the multi-stylus recording electrode and the return electrode, with the voltage of the image-delineating signals changed from 5 V to 150 V.

The number of image gradation levels that can be used in practice for reproduction was 12.

EXAMPLE 3-2

Example 3-1 was repeated except that the voltage of the image-delineating signals was fixed at 60 V, and the application time (pulse width) of the image-delineating current was changed from 0.05 msec to 1.0 msec, so that non-impact electrothermic dot recording was performed on a sheet of plain paper by use of the ink sheet No. 3.

As a result, the number of image gradation levels that can be used in practice for reproduction was 12.

EXAMPLE 4-1

A mixture of the following components was dispersed in a ball mill for 5 hours, so that an electroconductive base layer formation liquid was prepared:

| | Parts by Weight |
|---|---|
| Triacetate cellulose | 9.3 |
| Carbon black | 0.7 |
| Methylene chloride | 100.0 |

The thus prepared electroconductive base layer formation liquid was coated on a glass plate by a doctor blade and was then dried, so that an electroconductive base layer with a thickness of 10 μm and a layer resistance of 20Ω was prepared.

A mixture of the following components was dispersed in a ball mill for 8 hours, so that an electroconductive image transfer ink layer formation liquid was prepared:

| | Parts by Weight |
|---|---|
| Styrene - butadiene copolymer | 8.3 |
| Carbon black | 2.0 |
| Ethyl alcohol | 120.0 |

The thus prepared electroconductive image transfer ink layer formation liquid was coated on the above prepared electroconductive base layer by a doctor blade and was then dried, so that an electroconductive image transfer ink layer with a thickness of 5 μm and a layer resistance of 0.5Ω was prepared.

The electroconductive base layer and the electroconductive image transfer ink layer were integrally peeled off the glass plate, whereby an ink sheet No. 4 according to the present invention was prepared. The effective resistance of the ink sheet No. 4 was 5KΩ.

The ink sheet No. 4 was placed on a sheet of plain paper in such a manner that its ink layer was in close contact with the plain paper. By use of the same non-impact electrothermic recording apparatus as that employed in Example 1-1, non-impact electrothermic recording was then performed under the conditions that image-delineating signals was a pulse width of 1.0 msec were applied between the multi-stylus recording electrode and the return electrode, with the voltage of the image-delineating signals changed from 50 V to 200 V.

Figure 6A:
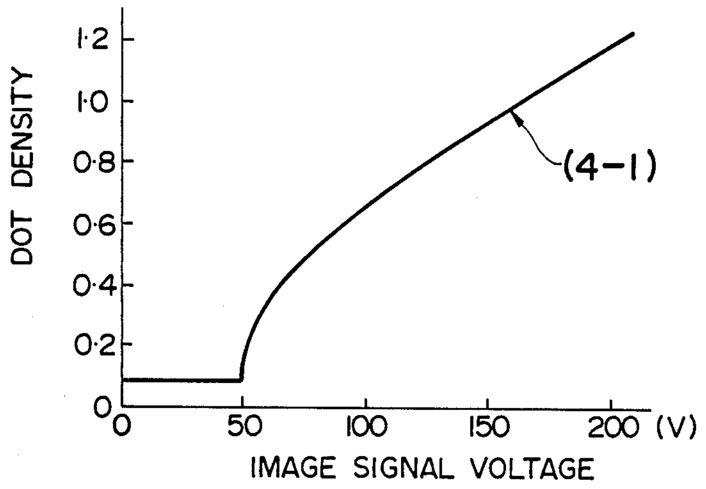
FIG. 6*a* is a graph in explanation of the relationship between the recorded dot density and the voltage of the image-delineating signals when the voltage was changed with the pulse width (application time) of the applied image-delineating signals kept constant in Example 4-1.

The relationship between the recorded dot density and the voltage of the image-delineating signals was as shown by the curve (4-1) in FIG. 6*a*. The number of image gradation levels that can be used in practice for reproduction was 12.

EXAMPLE 4-2

Example 4-1 was repeated except that the voltage of the image-delineating signals was fixed at 200 V, and the application time (the pulse width) of the image-delineating current was changed from 0.2 msec to 1.2 msec, so that non-impact electrothermic dot recording was performed on a sheet of plain paper by use of the ink sheet No. 4.

Figure 6B:
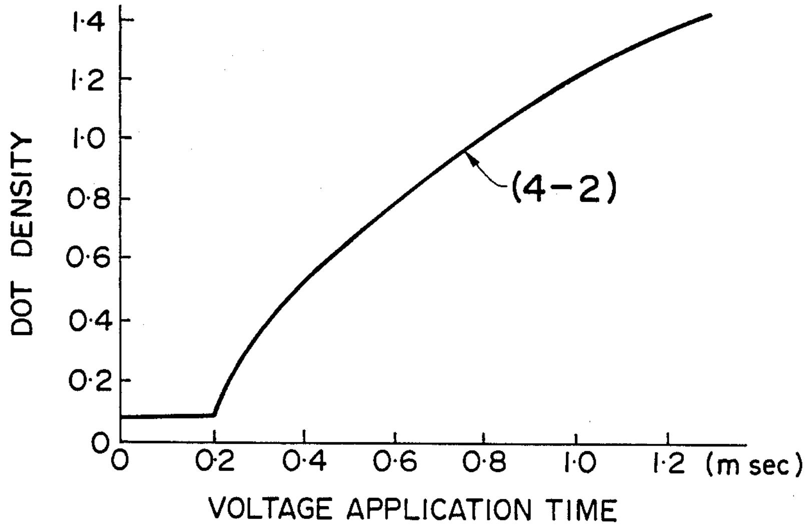
FIG. 6*b* is a graph in explanation of the relationship between the recorded dot density and the application time of the image-delineating signals when the pulse width (application time) of the applied image-delineating signals was changed with the voltage of the applied image-delineating signals kept constant in Example 4-2.

The relationship between the recorded dot density and the application time of the image-delineating signals was as shown by the curve (4-2) in FIG. 6*b*. The number of image gradation levels that can be used in practice for reproduction was 14.

COMPARATIVE EXAMPLE 2

An electroconductive thin layer of Al with a thickness of 0.1 μm was formed by vacuum deposition on an electro-conductive base layer with a thickness of 15 μm consisting of 90 wt. % of 6-nylon and 10 wt. % of carbon black which was prepared by the extrusion method.

A mixture of the following components was added to a mixed solvent consisting of methyl ethyl ketone and toluene with a mixing ratio of 1:1 by weight and was dispersed in a ball mill for 8 hours, so that an electroconductive image transfer ink layer formation liquid was prepared:

| | Parts by Weight |
|---|---|
| Ethylene - vinylacetate copolymer | 20 |
| Microwax | 65 |
| Phthalocyanine | 15 |

The thus prepared ink layer formation liquid was coated on the above electroconductive thin layer by a doctor blade and was then dried, so that an electroconductive image transfer ink layer with a thickness of 5 μm was formed. Thus a comparative ink sheet No. 2 was prepared. The effective resistance of the comparative ink sheet No. 2 was 100KΩ. Because of this high effective resistance of this ink sheet, non-impact electrothermic recording by use of this comparaitve ink sheet was not achieved even when the voltage of the image-delineating signals was increased to 300 V.

COMPARATIVE EXAMPLE 3

A 15 μm thick electroconductive base film consisting of 90 wt. % of 6-nylon and 10 wt. % of electroconductive carbon black was prepared by the extrusion method. It was impossible to take up by a taking-up roller of the film formation apparatus.

Therefore, a sample base film was made by cutting it from the above base film, and aluminum was deposited with a thickness of 0.1 μm on the sample base film in the same manner as in Comparative Example 2, so that an electro-conductive thin layer was formed on the sample base film.

The electroconductive image transfer ink layer formation liquid prepared in Comparative Example 2 was coated on the electroconductive thin layer by a doctor blade and was then dried, whereby an electroconductive image transfer ink layer with a thickness of 5 μm was formed. Thus, a comaparative ink sheet No. 3 was prepared. The effective resistance of the comparative ink sheet No. 3 was 30Ω.

Non-impact electrothermic recording was possible by use of this comparative ink sheet. However, when the recording of 30 dots or more was simultaneously carried out by use of the multi-stylus electrode, the required total current for recording amounted to 10 A, so that an expensive power source having a larger current capacity than that of the usually employed power source was necessary for recording when this comparative ink sheet was employed.

EXAMPLE 5-1

A mixture of the following components was added to a mixed solvent consisting of methyl ethyl ketone and toluene with a mixing ratio of 1:1 by weight and was dispersed in a ball mill for 8 hours, so that an electroconductive image transfer ink layer formation liquid was prepared:

| | Parts by Weight |
|---|---|
| Ethylene - vinylacetate copolymer | 85 |
| Carbon black | 15 |

The thus prepared ink layer formation liquid was coated by a doctor blade on a 12 μm thick electroconductive base layer consisting of 90 wt. % of diacetate cellulose and 10 wt. % of carbon black and was then dried, whereby an electroconductive image transfer ink layer with a thickness of 8 μm was formed. Thus, an ink sheet No. 5 for use in the present invention was prepared. The effective resistance of the ink sheet No. 5 was 12KΩ.

The ink sheet No. 5 was placed on a sheet of plain paper in such a manner that the ink layer was in close contact with the plain paper. By use of the same non-impact electrothermic recording apparatus as that employed in Example 1-1, non-impact electrothermic recording was then performed under the conditions that image-delineating signals was a pulse with a 0.5 msec were applied between the multi-stylus recording electrode and the return electrode, with the voltage of the image-delineating signals changed from 50 V to 300 V.

The number of image gradation levels that can be used in practice for reproduction was 8.

EXAMPLE 5-2

Example 5-1 was repeated except that the voltage of the image-delineating signals was fixed at 250 V, and the application time (the pulse width) of the image-delineating current was changed from 0.05 msec to 1.0 msec, so that non-impact electrothermic dot recording was performed on a sheet of plain paper by use of the ink sheet No. 5.

The number of image gradation levels that can be used in practice for reproduction was 10.

In order to compare the non-impact electrothermic recording method according to the present invention and a conventional thermosensitive image transfer method using a thermosensitive image transfer medium having a thermo-sensitive ink layer which is softened or melted upon application of heat, in particular, with respect to the relationship between the voltage of image-delineating signals and the obtained dot density and the relationship between the application time of image-delineating signals and the obtained dot density, the following comparative tests were performed in Comparative Example 4 and Comparative Example 5.

COMPARATIVE EXAMPLE 4

A thermosensitive ink sheet comprising a 10 μm thick polyester film serving as base layer and a thermosensitive ink layer comprising 80 wt. % of styrene - butadiene copolymer and 20 wt. % of carbon black formed on the polyester film was prepared.

This thermosensitive ink sheet was placed in close contact with a sheet of plain paper and dot recording was performed by use of a thermal head for the thermosensitive image transfer recording process. The pulse width of the image-delineating signals applied to the thermal head was fixed at 3.0 ms, and the voltage of the image-delineating signals was changed from 5 V to 20 V.

Figure 7:
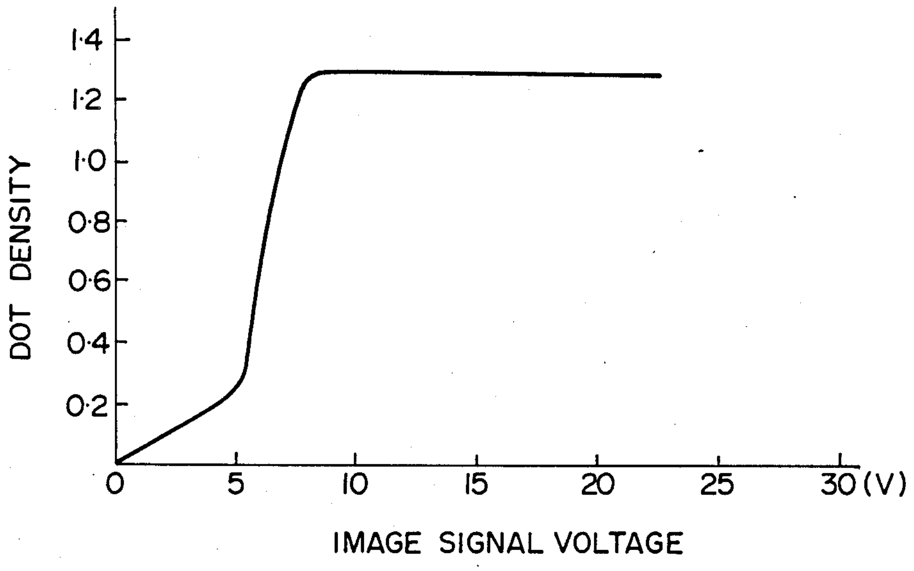
FIG. 7 is a graph in explanation of the relationship between the recorded dot density and the voltage of the image-delineating signals when the voltage was changed with the pulse width (application time) of the applied image-delineating signals kept constant in Comparative Example 4.

As a result, the relationship between the voltage of the image-delineating signals and the dot density as shown by the curve in FIG. 7 was obtained. This indicates that when the voltage of the image-delineating signals exceeded about 6 V, the ink portion of the thermosensitive ink layer was transferred at once to the plain paper and no image gradations as those obtained in the present invention were obtained.

COMPARATIVE EXAMPLE 5

A thermosensitive ink sheet was prepared, comprising (a) a 6 μm thick polyester film serving as base layer, (b) a 0.1 μm thick aluminum layer serving as electroconductive thin layer deposited on the polyester film and (c) a 4 μm thick thermosensitive ink layer formed on the aluminum layer consisting 85 wt. % of ethylene - vinyl acetate copolymer and 15 wt. % of carbon black formed on the polyester film.

This thermosensitive ink sheet was placed in close contact with a sheet of plain paper and dot recording was performed by use of a thermal head for the thermosensitive image transfer recording process. The voltage of the image-delineating signals applied to the thermal head was fixed at 10 V, and the pulse width of the image-delineating signals was changed from 1 ms to 20 ms.

Figure 8:
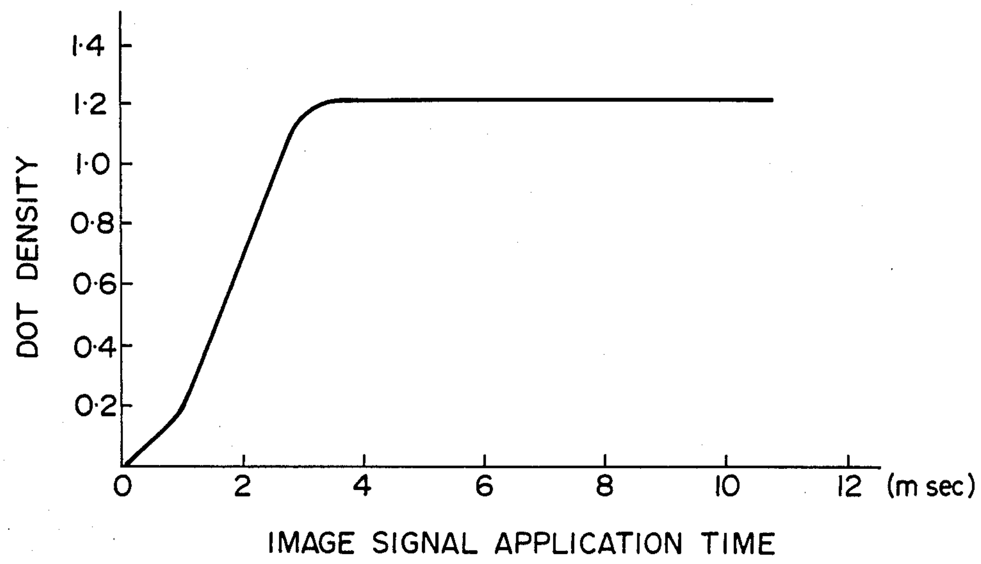
FIG. 8 is a graph in explanation of the relationship between the recorded dot density and the application time of the image-delineating signals when the pulse width (application time) of the applied image-delineating signals was changed with the voltage of the applied image-delineating signals kept constant in Comparative Example 5.

As a result, the relationship between the voltage of the image-delineating signals and the dot density as shown by the curve in FIG. 8 was obtained. This indicates that when the pulse width (application time) of the image-delineating signals exceeded about 6 V, the ink portion of the thermosensitive ink layer was transferred at once to the plain paper and no image gradations as those obtained in the present invention were obtained.

What is claimed is:

1. In a non-impact electrothermic recording method comprising the steps of superimposing on a recording medium an ink sheet comprising an electroconductive thermal-transferable ink material; placing a recording electrode and a return electrode in close contact with said ink sheet, said return electrode disposed at a predetermined distance from the recording electrode, with the contact area with said ink sheet of said recording electrode being smaller than the contact area with said ink sheet of said return electrode; applying between said recording electrode and said return electrode either (i) image-delineating voltage signals with a fixed application time, with the voltage of said image-delineating signals changed in accordance with the image density of images to be reproduced on said recording medium, or (ii) image-delineating voltage signals with a fixed voltage, with the application time changed in accordance with the image density of images to be reproduced on said recording medium, so as to generate Joule's heat in the portions in said ink sheet immediately below said recording electrode; and transferring said electroconductive thermal-transferable ink material from said ink sheet to said recording medium, the improvement wherein an ink sheet essentially consists of an electroconductive base layer, an electroconductive thin layer formed on said electroconductive base layer, and an electroconductive image transfer ink layer formed on said electroconductive thin layer, with the effective resistance of said ink sheet being in the range of from 50 ohms to 20 kilohms, is employed.

2. The non-impact electrothermic recording method as claimed in claim 1, wherein the thickness of said electro-conductive image transfer ink layer is in the range of from 1 μm to 10 μm.

3. The non-impact electrothermic recording method as claimed in claim 1, wherein the thickness of said electro-conductive image transfer ink layer is in the range of from 3 μm to 6 μm.

4. The non-impact electrothermic recording method as claimed in claim 1, wherein the thickness of said electro-conductive thin layer is in the range of from 0.01 μm to 5 μm.

5. The non-impact electrothermic recording method as claimed in claim 1, wherein the thickness of said electro-conductive thin layer is in the range of from 0.05 μm to 2 μm.

6. The non-impact electrothermic recording method as claimed in claim 1, wherein the thickness of said electro-conductive base layer is in the range of from 5 μm to 30 μm.

7. The non-impact electrothermic recording method as claimed in claim 1, wherein the thickness of said electro-conductive base layer is in the range of from 10 μm to 20 μm.

8. The non-impact elecctrothermic recording method as claimed in claim 1, wherein the effective resistance of said ink sheet is in the range of from 50Ω to 1KΩ.

9. The non-impact electrothermic recording method as claimed in claim 1, wherein the voltage of said image-delineating signals applied is in the range of from 3 V to 400 V.

10. The non-impact electrothermic recording method as claimed in claim 1, wherein the voltage of said image-delineating signals applied is in the range of from 5 V to 300 V.

* * * * *